United States Patent [19]

Waite et al.

[11] 4,066,126
[45] Jan. 3, 1978

[54] SURFACTANT WATERFLOODING WITH HYDROCARBON SLUG

[75] Inventors: Jerry M. Waite; Ralph F. Burdyn, both of Dallas, Tex.

[73] Assignee: Mobil Oil Corporation, New York, N.Y.

[21] Appl. No.: 752,590

[22] Filed: Dec. 20, 1976

[51] Int. Cl.² .......................................... E21B 43/22
[52] U.S. Cl. .................................................... 166/273
[58] Field of Search .............. 166/273, 274, 275, 270, 166/305 R, 252

[56] References Cited

U.S. PATENT DOCUMENTS

| | | | |
|---|---|---|---|
| 2,669,306 | 2/1954 | Teter et al. | 166/273 |
| 3,135,326 | 6/1964 | Santee | 166/273 X |
| 3,372,749 | 3/1968 | Williams | 166/274 |
| 3,468,377 | 9/1969 | Dunlap et al. | 166/274 |
| 3,491,834 | 1/1970 | Ahearn et al. | 166/273 |
| 3,508,612 | 4/1970 | Reisberg et al. | 166/275 X |
| 3,729,053 | 4/1973 | Froning | 166/273 X |
| 3,811,505 | 5/1974 | Flournoy et al. | 166/273 X |
| 3,827,497 | 8/1974 | Dycus et al. | 166/274 |
| 3,865,187 | 2/1975 | Carlin et al. | 166/273 |
| 3,927,716 | 12/1975 | Burdyn et al. | 166/274 X |

OTHER PUBLICATIONS

Cash et al., "Modeling Crude Oils for Low Interfacial Tension" SPE of AIME, paper No. 5813, 3-(22-24)-76, 9 pages.
Foster, "A Low-Tension Waterflooding Process," Journal of Petroleum Tech., vol. 25, Feb. 1973, pp. 205–210.

Primary Examiner—Stephen J. Novosad
Attorney, Agent, or Firm—C. A. Huggett; William D. Jackson

[57] ABSTRACT

Surfactant waterflooding process involving the injection of a hydrocarbon slug followed by a surfactant slug and a mobility control slug. The hydrocarbon slug has a viscosity less than that of the reservoir oil and is injected within the range of 0.01–0.04 pore volume. The surfactant slug is injected in an amount within the range of 0.05–0.3 pore volume and exhibits a surfactant concentration within the range of 0.5–4.0 weight percent. At least a portion of the mobility control slug has a viscosity at least as great as the viscosity of the hydrocarbon slug.

12 Claims, 2 Drawing Figures

SURFACTANT WATERFLOODING WITH HYDROCARBON SLUG

BACKGROUND OF THE INVENTION

This invention relates to the recovery of oil from subterranean oil reservoirs and more particularly to improved waterflooding operations involving the injection of a relatively low viscosity hydrocarbon followed by an aqueous surfactant slug.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques has been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To data one of the more promising low tension waterflooding techniques involves the injection of aqueous solutions of petroleum sulfonates within a designated equivalent weight range and under controlled conditions of salinity. For example, in a paper by W. R. Foster entitled "A low-Tension Waterflooding Process", Journal of Petroleum Technoloqy, Vol. 25, Feb. 1973, pp. 205-210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. This slug is substantially free of divalent ions which would tend to precipitate the surfactant slug. It, as well as the surfactant slug, may contain inorganic sacrificial agents such as sodium carbonate and/or sodium tripolyphosphate which function to improve the water wettability of the reservoir rock surfaces and reduce adsorption of the surfactant.

The surfactant slug comprises an aqueous solution of petroleum sulfonates having an average molecular weight within the range of 350–500 in concentrations ranging from about 1.0–3.0 weight percent. The surfactant slug contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. This mobility control slug has a lower sodium chloride concentration than the surfactant slug. This somewhat lower salinity functions to increase the desorption of the previously adsorbed surfactant to move the surfactant through the reservoir by a chromatographic-desorption process.

Various modifications of, or alternatives to, surfactant waterflooding involve the injection of a surfactant and a hydrocarbon slug or the injection of surfactants in both a hydrocarbonaceous solution and an aqueous solution. For example, U.S. Pat. No. 3,468,377 to Dunlap et al. discloses the injection of an aqueous solution of petroleum sulfonates having a median molecular weight within the range of about 375 to about 430. The aqueous surfactant solution may be preceded by a hydrocarbonaceous solution of surfactants in a volume of about one-tenth of to about equal to the volume of the aqueous solution with the total volume of the hydrocarbonaceous and aqueous solution being from about 0.01 to about 0.2 pore volume. U.S. Pat. No. 3,491,834 to Ahearn et al . discloses the injection of a nonpolar (hydrocarbon) slug containing a preferentially oil-soluble sulfonate surfactant followed by a polar (aqueous) slug containing a somewhat lower molecular weight sulfonate which is preferentially water-soluble. The size of the nonpolar slug is said to be between 0.5 percent and 20 percent of the reservoir pore volume and preferably between 2 percent and 10 percent. The polar slug varies from 0.5 percent to 100 percent of the pore volume, preferably from 25 percent to 75 percent, and may contain a thickening agent.

U.S. Pat. No. 3,865,187 to Carlin et al. discloses an oil recovery process which involves an emulsification mechanism resulting from the injection of a hydrocarbon solvent containing a mono-unsaturated secondary alcohol followed by an aqueous solution containing a sulfate salt of a fatty alcohol. Each of the respective slugs varies in size from about 5 percent to about 50 percent reservoir pore volume with the alcohol present in a concentration within the range of 0.1–10 percent by weight and the alcohol sulfate being present in amounts from about 0.1 to about 2.0 percent by weight. The aqueous slug may be followed by water containing a thickening agent in an amount from about 0.01 to 0.5 weight percent. Another process disclosed in U.S. Pat. No. 2,669,306 to Teter et al. involves the injection of a liquefied normally gaseous hydrocarbon such as propane, followed by the injection of drive water. The patentees disclose that recovery of hydrocarbons may be improved by the addition of surface-active agents selected so as to avoid emulsification difficulties.

SUMMARY OF THE INVENTION

In accordance with the present invention, there is employed a new and improved waterflooding process which involves the sequential injection of a relatively low viscosity hydrocarbon slug, a surfactant slug, and a mobility control slug. In carrying out the invention, there is injected into the reservoir via a suitable injection system a slug of hydrocarbon having a viscosity less than the viscosity of the reservoir oil. The hydrocarbon is injected in a relatively small amount within the range of 0.01–0.04 pore volume. Subsequent to the hydrocarbon slug, an aqueous surfactant slug is injected in an amount within the range of 0.05–0.3 pore volume. The surfactant concentration within this slug is within the range of 0.5–4.0 weight percent. An aqueous mobility control slug is injected in the reservoir after the surfactant slug. At least a portion of the mobility control slug exhibits a viscosity equal to or greater than the viscosity of the hydrocarbon slug. Subsequent to the injection of the mobility control slug, an aqueous flooding medium is injected into the reservoir in order to displace reservoir oil to a spaced production system from which the oil is recovered.

DESCRIPTION OF SPECIFIC EMBODIMENTS

Figure 1:
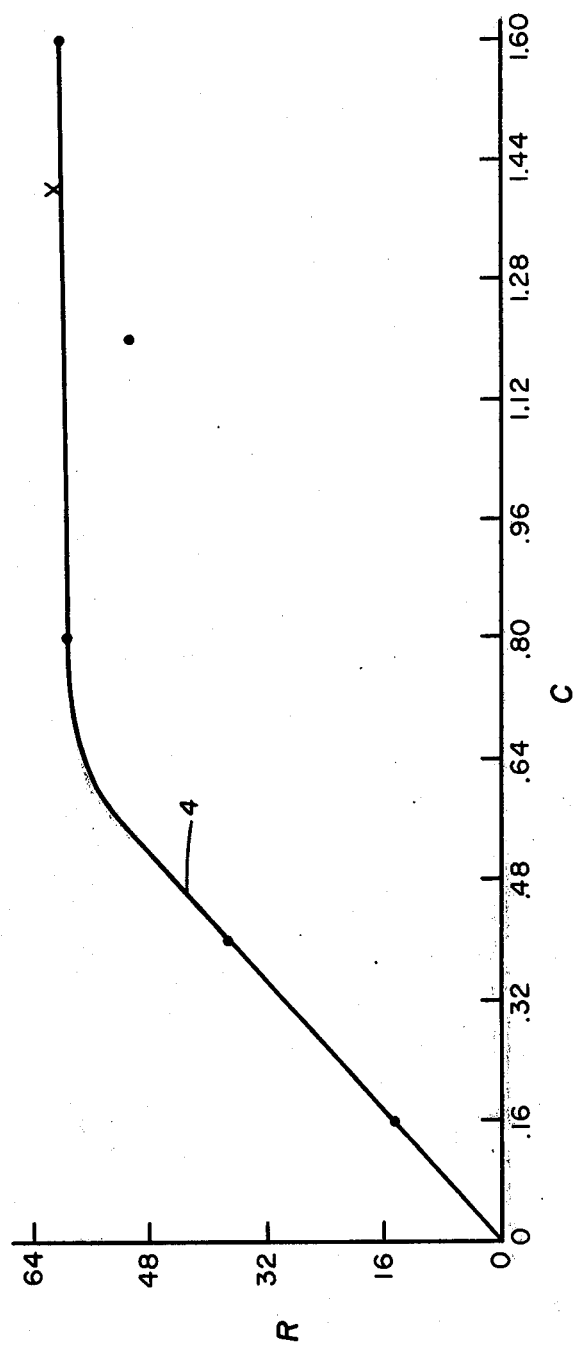
FIG. 1 is a graph illustrating the relationship between surfactant concentration and the displacement of decane by a surfactant slug.

As noted previously, it is a conventional practice in surfactant waterflooding to employ a thickening agent for mobility control purposes. The thickening agent may be present in the surfactant slug but in most cases it is employed in a discrete aqueous slug injected into the reservoir after the surfactant slug. The various thickening agents which have been heretofore proposed for use in mobility control applications include such natural materials as guar gum or karaya gum or such synthetic products as the ionic polysaccharide B-1459 produced by fermentation of glucose with the bacterium *Xanthomonas campestris* NRRL-1459 USDA and available from the Kelco Company under the trade name "Kelzan", polyglucosylglucans as disclosed in U.S. Pat. No. 3,372,749 to Williams and available from the Pillsbury Company under the trade name "Polytran", and the partially hydrolyzed polyacrylamides available from the Dow Chemical Company under the trade name "Pusher Chemicals".

In order to obtain effective mobility control, the thickening agent is employed in a concentration sufficient to impart a viscosity to the injected water at least equal to the viscosity of the reservoir oil. Significantly higher viscosities are sometimes used. For example, it is sometimes necessary to employ a mobility control slug having a viscosity four times or more of that of the reservoir oil in order to bank the oil for displacement through the reservoir to the production system.

The present invention results from the discovery that by preceding the surfactant slug with a relatively small amount of a low viscosity hydrocarbon, the maximum water viscosity needed for effective mobility control is significantly decreased. In addition, surfactant utilization in terms of the amount of surfactant needed per unit of reservoir rock to achieve a specified oil recovery under similar mobility drive conditions is likewise decreased.

In carrying out the invention, no more than about 0.04 reservoir pore volume of the low viscosity hydrocarbon should be employed ahead of the surfactant slug. With this amount maximum or near maximum tertiary oil recovery can be achieved and the amount of surfactant utilized, adjusted to reflect 100 percent tertiary oil recovery, can be reduced to values of less than 0.5 milligram of surfactant per gram of reservoir rock. The minimum amount of hydrocarbon required in carrying out the invention is about 0.01 reservoir pore volume.

The surfactant slug employed in carrying out the invention is injected in an amount within the range of 0.05–0.3 pore volume and exhibits a surfactant concentration within the range of 0.5–4.0 weight percent. As indicated by the experimental data presented hereinafter, there is a trade off between the amount of hydrocarbon injected and the amount of surfactant required to achieve comparable tertiary oil recovery under similar mobility drive conditions. There is a similar trade off between the viscosity values needed for effective mobility control and the amount of hydrocarbon slug injected. In most cases, the best balance between these factors is achieved by injecting from 0.02–0.03 pore volume of hydrocarbon and in a preferred embodiment of the invention the hydrocarbon slug is injected in an amount within this range.

The initially injected hydrocarbon slug exhibits a viscosity under reservoir conditions which is less than the viscosity of the reservoir oil. Preferably, the viscosity of the injected hydrocarbon is less than one-half of the viscosity of the reservoir oil. In the laboratory experiments described hereinafter, propane, hexane, decane, and a crude oil having a viscosity of about 1.7 centipoises were used in displacement tests carried out with respect to a crude oil exhibiting a viscosity of about 12 centipoises. Each of these hydrocarbons was approximately equal in effectiveness although it is preferred, because of practical considerations, to employ a normally liquid hydrocarbon, e.g. pentane and above, in carrying out the invention.

The surfactant employed in formulating the surfactant slug may be any suitable surfactant which is effective in reducing the interfacial tension between the injected aqueous liquid and the reservoir oil. Various surfactant formulations, either ionic or nonionic, have heretofore been proposed for use in surfactant waterflooding procedures and may be employed in the present invention. These include anionic compounds such as water-soluble monovalent metal salts of long chained organic acids, sulfonates, and sulfates, or nonionic compounds such as polyethoxylated alkyl phenols and polyethoxylated aliphatic alcohols. Multicomponent surfactant formulations may also be employed such as those disclosed in U.S. Pat. Nos. 3,508,612 to Reisberg et al. and 3,811,505 to Flournoy et al.

A preferred class of surfactants used in carrying out the present invention is sulfonate surfactants in which the lipophilic portion of the surfactant molecule has a molecular weight, referred to herein as the "lipophilic base molecular weight" within the range of 250–400. These include alkylaryl sulfonates such as the synthetic sulfonates derived from sulfonation of products such as keryl benzene and the petroleum sulfonates derived from sulfonation of petroleum oils or petroleum oil fractions. Normally petroleum sulfonates will be preferred since they are more economical than the synthetic sulfonates and since they usually provide a mixture of sulfonates having a fairly wide equivalent weight distribution which is helpful in arriving at a desired low interfacial tension. The sulfonates may be employed in the form of their alkali metal, ammonium, or substituted ammonium salts. Where an alkali metal form is used, it usually will be the sodium or potassium salt. Substituted ammonium salts which may be employed include methylammonium, ethylammonium, and normal- or iso-propylammonium salts. The substituted ammonium salts may also take the form of mono-, di-, or tri-substituted alkanolammonium salts such as monoethanolammonium or triethanolammonium. In the case of the sodium salt, the water-soluble sulfonate group would have a molecular weight of a little over a hundred. Thus to provide a lipophilic base molecular weight within the aforementioned range, the sodium alkylaryl sulfonates would exhibit an average equivalent weight, assuming 100 percent monosulfonation, within the range of 350–500. Sulfonates with an intermediate linkage between the sulfonate group and the lipophilic base also may be employed in carrying out the invention. These include amide linked sulfonates such as disclosed in U.S. patent application Ser. No. 560,289 by Birk, filed Mar. 20, 1975, now U.S. Pat. No. 4,008,768 and various ether linked sulfonates such as disclosed in U.S. Pat. No. 3,827,497 to Dycus et al.

The sulfonate surfactants may be employed alone or in combination with other surface-active agents, particularly where it is desired to achieve tolerance to high salinities and relatively high concentrations of divalent metal ions. Where the sulfonate surfactant is employed alone without a stabilizing co-surfactant, the salinity of the surfactant slug should be adjusted to a value within the range of 0.5 to 3.0 weight percent for good oil recovery and should contain no more than about 50–100 parts per million divalent cations. Where a stabilizing co-surfactant such as a sulfated polyethoxylated alcohol, as disclosed in U.S. Pat. No. 3,508,612 to Reisberg et al., or a nonionic polyethoxylated aliphatic alcohol or polyethoxylated alkyl phenol, as disclosed in U.S. Pat. No. 3,811,505 to Flournoy et al., is employed, of course much higher salinities and divalent metal ion concentrations may be employed.

The present invention is to be distinguished from those processes such as disclosed in the aforementioned patents to Dunlap et al. and Ahearn et al. which involve the injection of a hydrocarbonaceous surfactant slug either alone or in combination with the injection of an aqueous surfactant slug. In the present invention, the hydrocarbon slug is not employed as a surfactant carrier and it is neither necessary nor desirable that it contain a surfactant. If a surfactant is added in the hydrocarbon slug, it should be present in a concentration less than one-half of the surfactant concentration in the surfactant slug to minimize the possibility of forming an inverted emulsion (water-in-oil) which would adversely affect the viscosity of the hydrocarbon slug.

The results achieved by the present invention in terms of oil displacement, mobility bank viscosity, and surfactant requirements are illustrated by laboratory displacement tests carried out on a crude oil for which the displacement efficiency by conventional surfactant waterflooding was relatively poor. The crude oil was employed in two forms, one "stock tank" oil having very little dissolved gases therein and the other "separator" oil recovered from an oil-gas separator and thus containing light hydrocarbons. The stock tank oil exhibited a pour point of approximately 22° C. and a viscosity of 6 centipoises at 60° C. and about 12 centipoises at 38° C. The viscosity of the separator oil appeared similar to that of the stock tank oil.

The surfactants employed in these displacement tests were commercial petroleum sulfonates identified as TRS 10-80, Stepan 106, Petrostep 420, Petrostep 450, and Petrostep 465. TRS 10-80 is a sodium petroleum sulfonate having an average equivalent weight of about 420 and an equivalent weight distribution of about 335–460. TRS 10-80 is available from the Witco Chemical Company. Stepan 106 is a sodium petroleum sulfonate available from the Stepan Chemical Company and has an average equivalent weight of about 435 with an equivalent weight distribution of 160–629. The Petrostep products are sodium petroleum sulfonates available from the Stepan Chemical Company with the numerical suffixes indicating their approximate average equivalent weights. The hydrocarbon banks employed in the displacement experiments were formulated from propane, hexane, decane, and a naphthenic base crude oil produced from the West Ranch Field, Texas. The crude oil had a viscosity at 25° C. of 1.74 centipoises and an "equivalent alkane carbon number", as calculated in accordance with Cash et al., "Modeling Crude Oils for Low Interfacial Tension", SPE Paper No. 5813*, of 6.25.

*Presented at the Crude Oil Recovery Symposium of the Society of Petroleum Engineers of AIME at Tulsa, Okla., Mar. 22–24, 1976.

The displacement experiments were performed in plastic or glass tubes having inside diameters of about ¼ to 5/16 inch and varying in length from 3 feet to 6 feet. For each tube run, the tube was packed with unconsolidated Berea sand and then saturated with saline (2.0 weight percent sodium Chloride) water. The crude oil was then flooded into the tube until the effluent from the tube contained no water in order to arrive at an initial oil saturation. In most tube runs, a waterflood was then simulated by injecting water having a salinity of 2.2 weight percent until no more oil was produced from the tube in order to arrive at a waterflood residual oil saturation. Thereafter, displacement experiments with and without the injection of a hydrocarbon slug were carried out. In each case, the run was carried out at a temperature of 35° C. and the hydrocarbon slug (or the surfactant slug if the hydrocarbon slug was not employed) was immediately preceded by a preflush slug.

The results of the displacement tests are summarized in Table I. Table I characterizes the preflush slug in terms of the pore volume amount injected and the total salinity in weight percent arrived at by adding various amounts of sodium chloride, sodium carbonate, and sodium tripolyphosphate to distilled water. The hydrocarbon slug is characterized in Table I by the identification of the particular hydrocarbon used in formulating the slug and the pore volume amount in which it was injected. The surfactant slug is characterized in terms of the identity, ID, of the surfactant employed, the surfactant concentration, C, in weight percent, the pore volume amount, the amount $S_T$ of surfactant employed in terms of milligrams of surfactant per gram of sand, and the total salinity of the surfactant slug, again arrived at by adding various amounts of sodium chloride, sodium carbonate, and sodium tripolyphosphate to distilled water.

The chase slug is identified in Table I in terms of the percent concentration of thickener employed (in each case Kelzan) and in terms of total salinity arrived at as described previously. The viscosities of the Kelzan solution were not measured at the elevated temperature at which the displacement tests were carried out; however, at room temperatures Kelzan in concentrations of 0.05, 0.1, and 0.18 weight percent produced viscosities of 16, 40, and 210 centipoises, respectively, measured in a Brookfield viscometer with UL adapter at 1.5 rpm. These relative viscosities produced by the varying Kelzan concentrations would remain approximately the same at the elevated temperature although the absolute viscosities would be reduced somewhat.

Table I presents the percent oil recovery, R, at the conclusion of the experiment and also the remaining residual oil saturation $S_0$. The last column of Table I presents the amount of surfactant employed as normalized to 100 percent oil recovery. This normalized amount $S_r$ is arrived at by dividing the amount of surfactant $S_T$ in milligrams of surfactant per gram of sand by the decimal equivalent of the percent oil recovery. The percent oil recovery, R, is representative of tertiary oil recovery (the percent of waterflood residual oil recovered) except in the case of Runs 12–15 and 18–20. In these runs which are marked by an asterisk, an initial waterflood was not carried out and thus the values of R for these runs are representative of total oil recovery.

It can be seen from an examination of the data presented in Table I that the present invention achieves significantly higher oil recoveries at lower viscosity mobility drives and surfactant utilization then oil recoveries achieved by the conventional surfactant waterflooding technique. Runs 1–11, 12*–15*, 18*, 41, 43, and 45 involved the injection of a surfactant slug and a mobility control slug without a preceding hydrocarbon slug. The tertiary oil recoveries observed were generally low, ranging in most cases from about 10 to 50 percent. When higher tertiary oil recoveries were achieved, surfactant utilization and the mobility slug viscosity were generally high. For example, Runs 7, 41, and 43 resulted in tertiary oil recoveries of 77.9, 89, and 93.8 percent, respectively. In each of these runs, highly viscous mobility control slugs having Kelzan concentrations of 0.17 or 0.18 weight percent were employed. Furthermore, in only one case, Run 43, was the surfactant utilization normalized to reflect 100 percent oil recovery ($S_r$) less than 1 milligram per gram.

The displacement tests simulating the practice of the present invention generally produced higher tertiary oil recoveries under similar conditions of mobility control and surfactant utilization than those achieved in the test runs discussed above. Direct comparisons, in terms of the surfactant employed, can be made for Petrostep 450 and Stepan 106. Thus, Runs 30 and 32 employing Petrostep 450 followed by a mobility control slug containing 0.1 weight percent Kelzan may be compared with Run 45, likewise employing Petrostep 450 followed by 0.1 weight percent Kelzan solution. As can be seen from an examination of the data in Table I, Runs 30 and 32 produced appreciably higher recoveries than Run 45. More significantly, the amounts of surfactant utilized normalized to 100 percent oil recovery for Runs 30 and 32 were less than one-half of that for Run 45. Even when compared with Runs 41 and 43, in which significantly higher Kelzan concentrations were employed, the values of $S_r$ for Runs 30 and 32 were significantly less than those for Runs 41 and 43.

TABLE I

| Run No. | Preflush PV | Sal. | Hyd. PV | Surfactant Slug ID | C(%) | PV | $S_T$ | Sal(%) | Chase C(%) | Sal(%) | R % | $S_o$ % | $S_r$ |
|---|---|---|---|---|---|---|---|---|---|---|---|---|---|
| 1 | .11 | 1.5 | | S1 | 1.33 | 0.21 | 0.6 | 1.5 | 0.1 | 0.6 | 47.0 | 16.9 | 1.28 |
| 2 | .11 | 1.5 | | S1 | 1.33 | 0.24 | 0.6 | 1.5 | 0.1 | 0.6 | 25.5 | 18.6 | 2.35 |
| 3 | .10 | 1.5 | | S1 | 1.33 | 0.18 | 0.6 | 1.5 | 0.1 | 0.6 | 41.5 | 15.1 | 1.45 |
| 4 | .10 | 1.5 | | S1 | 1.33 | 0.23 | 0.6 | 1.5 | 0.05 | 0.6 | 11.5 | 25.0 | 5.22 |
| 5 | .10 | 2.0 | | S1 | 1.33 | 0.50 | 1.2 | 1.6 | 0.05 | 0.6 | 10.0 | 28.6 | 12.0 |
| 6 | .21 | 2.2 | | S2 | 2.0 | 0.27 | 1.2 | 2.2 | 0.05 | 1.2 | 20.7 | >30.0 | 5.80 |
| 7 | .22 | 2.8 | | S2 | 2.0 | 0.19 | 0.9 | 2.6 | 0.18 | 1.2 | 77.9 | 5.2 | 1.15 |
| 8 | .20 | 3.4 | | S2 | 2.0 | 0.18 | 0.9 | 3.4 | 0.18 | 1.8 | 60.7 | 9.4 | 1.48 |
| 9 | .22 | 2.2 | | S2 | 1.6 | 0.24 | 0.9 | 2.2 | 0.18 | 1.2 | 47.2 | 13.3 | 1.91 |
| 10 | .24 | 2.6 | | S2 | 1.6 | 0.24 | 0.9 | 2.6 | 0.18 | 1.8 | 37.8 | 15.2 | 2.38 |
| 11 | .20 | 1.6 | | S1 | 1.6 | 0.23 | 0.9 | 1.6 | 0.075 | 0.8 | 16.7 | 22.2 | 5.39 |
| 12* | 1.05 | 6.0 | | S2 | 1.6 | 0.24 | 0.92 | 2.2 | 0.05 | 1.2 | 66.03 | 25.0 | 1.39 |
| 13* | 1.05 | 6.0 | | S2 | 1.6 | 0.02 | 0.09 | 2.2 | 0.05 | 1.2 | 74.4 | 19.2 | 1.22 |
| | | | | | | 0.21 | 0.82 | 1.6 | | | | | |
| 14* | 1.05 | 2.0 | | S2 | 1.6 | 0.25 | 0.91 | 2.2 | 0.05 | 1.4 | 70.7 | 21.1 | 1.29 |
| 15* | 1.08 | 2.0 | | S2 | 1.6 | 0.23 | 0.90 | 2.8 | 0.05 | 1.8 | 77.9 | 16.1 | 1.16 |
| 16 | 2.20 | 2.4 | P .1 | S2 | 1.6 | 0.24 | 0.91 | 2.8 | 0.10 | 1.8 | 95.0 | 1.0 | .96 |
| 17 | 2.12 | 2.0 | P .05 | S2 | 1.6 | 0.24 | 0.90 | 2.8 | 0.10 | 1.8 | 100.0 | | .9 |
| 18* | 1.05 | 2.0 | | S2 | 1.6 | 0.24 | 0.90 | 2.8 | 0.10 | 1.8 | 81.8 | 12.9 | 1.10 |
| 19* | 2.34 | 2.4 | P .05 | | | | | | 0.10 | 1.8 | 8.8 | 27.6 | |
| 20* | 1.05 | 2.0 | | | | | | | 0.10 | 1.8 | 66.0 | 22.0 | |
| 21 | 2.16 | 2.4 | P .02 | S2 | 1.6 | 0.27 | 0.96 | 2.8 | 0.10 | 1.8 | 87.5 | 2.6 | 1.10 |
| 22 | 2.08 | 2.4 | P .05 | S2 | 1.6 | 0.09 | 0.32 | 2.8 | 0.10 | 1.8 | 42.5 | 12.1 | .75 |
| 23 | 1.79 | 2.4 | P .02 | S2 | 1.6 | 0.26 | 0.90 | 2.8 | 0.10 | 1.8 | 92.4 | 1.8 | .97 |
| 24 | 1.98 | 2.4 | P .02 | S2 | 1.6 | 0.13 | 0.44 | 2.8 | 0.10 | 1.95 | 46.8 | 11.9 | .94 |
| 25 | 1.93 | 2.8 | P .04 | S2 | 1.6 | 0.20 | 0.97 | 2.8 | 0.05 | 1.8 | 16.3 | 21.5 | 5.95 |
| 26 | 2.24 | 2.8 | P .05 | S3 | 1.6 | 0.26 | 0.94 | 2.8 | 0.10 | 1.8 | 87.2 | 2.8 | 1.07 |
| 27 | 3.33 | 2.8 | P .04 | S3 | 1.6 | 0.13 | 0.45 | 2.8 | 0.10 | 1.8 | 97.8 | 0.45 | .46 |
| 28 | 2.23 | 2.4 | P .04 | S3 | 1.6 | 0.08 | 0.28 | 2.8 | 0.10 | 1.8 | 83.5 | 3.35 | .33 |
| 29 | 2.16 | 2.2 | P .04 | S3 | 1.6 | 0.08 | 0.27 | 2.8 | 0.10 | 1.8 | 68.4 | 8.0 | .4 |
| 30 | 2.10 | 1.7 | P .04 | S4 | 1.6 | 0.13 | 0.46 | 1.9 | 0.10 | 1.0 | 73.1 | | .46 |
| 31 | 2.07 | 1.7 | P .04 | S5 | 1.6 | 0.12 | 0.44 | 1.9 | 0.10 | 1.0 | 63.4 | | .44 |
| 32 | 2.27 | 2.2 | P .04 | S4 | 1.6 | 0.09 | 0.31 | 2.4 | 0.10 | 1.6 | 77.4 | | .31 |
| 33 | 2.50 | 2.2 | P .04 | S3 | 1.6 | 0.08 | 0.29 | 2.4 | 0.10 | 1.6 | 83.1 | | .29 |
| 34 | 1.83 | 1.8 | P .04 | S3 | 1.6 | 0.08 | 0.29 | 2.0 | 0.10 | 1.2 | 83.3 | | .29 |
| 35 | 2.27 | 2.2 | P .04 | S3 | 1.6 | 0.08 | 0.28 | 3.2 | 0.10 | 2.2 | 70.5 | | .40 |
| 36 | 2.48 | 1.4 | P .04 | S3 | 1.6 | 0.08 | 0.29 | 1.6 | 0.10 | 0.9 | 89.9 | | .32 |
| 37 | 2.04 | 2.2 | P .04 | S5 | 1.6 | 0.08 | 0.29 | 2.4 | 0.10 | 1.6 | 57.4 | | .51 |
| 38 | 2.45 | 2.2 | P .04 | S3 | 1.6 | 0.08 | 0.29 | 1.2 | 0.10 | 0.5 | 61.1 | | .47 |
| 39 | 2.02 | 2.2 | P .02 | S3 | 1.6 | 0.08 | 0.29 | 2.1 | 0.10 | 1.4 | 42.5 | | .68 |
| 40 | 2.01 | 2.2 | P .04 | S3 | 1.6 | 0.08 | 0.29 | 2.1 | 0.10 | 1.4 | 73.0 | | .40 |
| 41 | 1.83 | 2.2 | | S4 | 1.6 | 0.25 | 0.9 | 2.4 | 0.18 | 1.6 | 89.0 | | 1.01 |
| 42 | 1.95 | 2.2 | H .04 | S3 | 1.6 | 0.08 | 0.275 | 2.2 | 0.10 | 1.4 | 80.5 | | .34 |
| 43 | 1.29 | 2.2 | | S4 | 1.6 | 0.16 | 0.6 | 2.4 | 0.17 | 1.5 | 93.8 | | .65 |
| 44 | 1.90 | 2.2 | D .04 | S3 | 1.6 | 0.08 | 0.285 | 2.2 | 0.10 | 1.4 | 78.9 | | .36 |
| 45 | 1.93 | 2.2 | | S4 | 1.6 | 0.16 | 0.6 | 2.4 | 0.10 | 1.5 | 49.2 | | 1.22 |
| 46 | 2.08 | 2.2 | H .04 | S3 | 1.6 | 0.08 | 0.30 | 2.2 | 0.05 | 1.4 | 39.0 | | .77 |
| 47 | 1.64 | 2.2 | C .04 | S3 | 1.6 | 0.09 | 0.31 | 2.2 | 0.10 | 1.4 | 88.6 | | .35 |

TABLE I-continued

| Run No. | Preflush PV | Preflush Sal. | Hyd. PV | Surfactant Slug ID | Surfactant Slug C(%) | Surfactant Slug PV | Surfactant Slug $S_T$ | Sal(%) | Chase C(%) | Chase Sal(%) | R % | $S_o$ % | $S_r$ |
|---|---|---|---|---|---|---|---|---|---|---|---|---|---|
| 48 | 2.10 | 2.2 | H .04 | S3 | 1.6 | 0.17 | 0.3 | 2.2 | 0.05 | 1.4 | 94.0 | | .32 |

P — Propane
M — Hexane
D — Decane
C — Crude Oil
S1 — TRS 10-80
S2 — Stepan 106
S3 — Petrostep 420
S4 — Petrostep 450
S5 — Petrostep 465

Runs 21, 23, and 24 in which the surfactant employed was Stepan 106 may be compared with Runs 7, 8, 9, and 10. Here, Runs 21, 23, and 24 showed significantly lower surfactant utilization values $S_r$ than those for Runs 7, 8, 9, and 10 notwithstanding that the latter runs employed a much higher Kelzan concentration in the mobility control slug.

The relationship between the amount of low viscosity hydrocarbon injected and normalized surfactant utilization $S_r$ is illustrated by comparison of Runs 16, 17, 21–24, 26–40, 42, 44, and 47 which were all carried out at a Kelzan concentration in the mobility slug of 0.1 percent. Run 16 and Runs 17, 22, and 26 were carried out employing about 0.1 and 0.05 pore volume of hydrocarbon, respectively. Runs 21, 23, 24, and 39 were carried out employing about 0.02 pore volume of hydrocarbon and the remaining Runs 27–38, 40, 42, 44, and 47 were carried out by the injection of about 0.04 pore volume of hydrocarbon. As is apparent from an examination of this data, the minimum normalized surfactant utilization was achieved employing about 0.04 pore volume with no corresponding benefit observed by employing higher pore volume amounts. Usually it will be desirable to employ a somewhat lower amount of hydrocarbon slug and accept the higher surfactant requirements. Thus in a preferred embodiment of the invention, the low viscosity hydrocarbon slug is injected in an amount within the range of 0.02–0.03 pore volume.

As noted previously, the surfactant slug employed in carrying out the present invention contains from 0.5–4.0 weight percent surfactant. The effect of surfactant concentration on displacement of the previously injected hydrocarbon slug is shown in FIG. 1 which illustrates the results of displacement experiments carried out with respect to normal decane. The displacement experiments were conducted as tube runs similarly to those described previously and involved use of decane only as the oil phase which was reduced to residual oil saturation by brine waterflood. No thickener was used in the drive water following the surfactant slug.

In FIG. 1, curve 4 is a plot of percent decane recovery R on the ordinate versus surfactant concentration C in weight percent on the abscissa. The data points indicated by the legend O were obtained for a surfactant slug salinity of 1.8 weight percent sodium chloride and surfactant utilization of 0.3 milligram of surfactant per gram of sand. The first data point at a surfactant concentration of 0.16 weight percent was obtained by linear extrapolation from displacement run actually employing 0.4 milligram of surfactant per gram of sand. The data point indicated by the legend X was obtained employing 0.6 milligram of surfactant per gram of sand in a 1.4 weight percent sodium chloride solution. As can be seen from an examination of the data presented in FIG. 1, a surfactant concentration of at least 0.5 weight percent should be employed in order to obtain appreciable displacement of the hydrocarbon slug. Preferably a surfactant concentration within the range of 1.0–2.0 weight percent is employed in order to obtain a maximum or near maximum displacement. As noted previously, greater concentrations of up to 4.0 weight percent may be employed in order to accommodate dispersion and adsorption of the surfactant. The preferred amount of surfactant slug, particularly when employing the surfactant in a concentration of 1-2 weight percent, is within the range of 0.1-0.2 pore volume.

Figure 2:
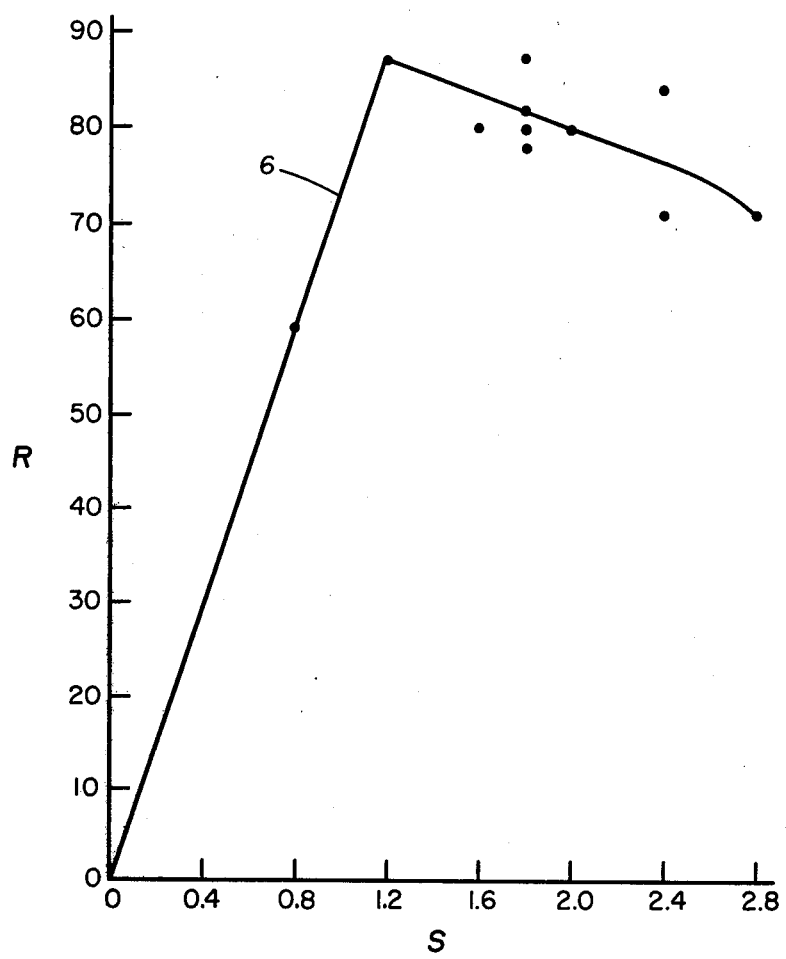
FIG. 2 is a graph illustrating the relationship between displacement efficiency and the salinity of a slug containing a sulfonate surfactant.

As one would expect, the displacement efficiency when employing sulfonate surfactants in carrying out the present invention varies with salinity. This relationship is illustrated in FIG. 2 in which curve 6 is a plot of the percent tertiary oil recovery R on the ordinate versus the salinity S of the surfactant solution on the abscissa. The salinity in each case was adjusted employing sodium carbonate and sodium tripolyphosphate in a concentration of 0.2 weight percent each plus sufficient sodium chloride to arrive at the total salinity value. The data points plotted in FIG. 2 are obtained from Runs 28, 29, 33–36, 38, 42, 44, 47, and 48 normalized to reflect the same amount of surfactant per gram of sand. From an examination of FIG. 2 it can be seen that if only a petroleum sulfonate is employed in the surfactant slug, the salinity should be adjusted to a value within the range of 1.2 to 2.4 in order to achieve optimum or near optimum oil recovery. Of course as noted earlier, other surfactant systems which are designed to tolerate higher salinities can be employed in carrying out the present invention.

After injection of the surfactant slug, the aqueous mobility control slug is injected. The polymeric materials noted earlier or other suitable water thickening agents may be added to water, preferably of a lower salinity than that of the surfactant slug, to formulate the mobility control slug. The thickening agent may be added in concentrations so as to provide graded viscosity at the trailing edge of the mobility control slug or graded viscosities at both the leading and trailing edges of the mobility control slug as disclosed in U.S. patent application Ser. No. 522,081, filed Nov. 7, 1974 by Chang, now U.S. Pat. No. 4,018,281. Alternatively, the thickening agent concentration may be relatively constant throughout. Regardless of the configuration used, the viscosity of at least a portion of the mobility control slug is at least as great as the viscosity of the hydrocarbon slug and may be equal to or greater than the viscosity of the reservoir oil. The mobility control slug normally will be injected in an amount within a range of 0.2–0.5 pore volume although greater or smaller amounts may be employed depending upon the viscosity of the slug and the reservoir characteristics. After the mobility control slug, a driving fluid is injected in order to displace the previously injected fluids through the formation. The driving fluid typically may be any water which is locally available and is not incompatible with the formation. The driving fluid is injected in such amount as necessary to carry the recovery process to its conclusion.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyan et al. Other well arrangements may be used in carrying out the present invention, examples of which are set forth in the Burdyn et al. patent. By the term "pore volume" as used herein, it is meant that volume of the portion of the formation underlying the well pattern employed, as described in greater detail in the Burdyn et al. patent.

We claim:

1. In the recovery of oil from a subterranean oil-containing reservoir penetrated by spaced injection and production system, the method comprising:
   a. injecting into said reservoir via said injection system a slug of hydrocarbon having a viscosity less than the viscosity of the reservoir oil in an amount within the range of 0.01–0.04 pore volume,
   b. thereafter injecting into said reservoir via said injection system an aqueous surfactant slug in an amount within the range of 0.05–0.3 pore volume, said surfactant slug containing a surfactant within a range of 0.5–4.0 weight percent,
   c. thereafter injecting into said reservoir via said injection system an aqueous mobility control slug, at least a portion of said mobility control slug having a viscosity at least as great as the viscosity of said hydrocarbon slug,
   d. thereafter injecting into said reservoir via said injection system an aqueous flooding medium to displace oil to said production system, and
   e. recovering oil from said production system.

2. The method of claim 1 wherein said surfactant slug is injected in an amount within the range of 0.1–0.2 pore volume.

3. The method of claim 2 wherein said hydrocarbon slug is injected in an amount within the range of 0.02–0.03 pore volume.

4. The method of claim 1 wherein said surfactant slug contains a sulfonate surfactant having an average lipophilic base molecular weight within the range of 250–400.

5. The method of claim 4 wherein said sulfonate surfactant is present in a concentration within the range of 1.0–2.0 weight percent.

6. The method of claim 5 wherein said surfactant slug is injected in an amount within the range of 0.1–0.2 pore volume.

7. The method of claim 6 wherein said hydrocarbon slug is injected in an amount within the range of 0.02–0.03 pore volume.

8. The method of claim 1 wherein said hydrocarbon slug is free of added surfactants or contains added surfactants in a concentration less than one-half of the surfactant concentration in said surfactant slug.

9. The method of claim 8 wherein said hydrocarbon slug is injected in an amount within the range of 0.02–0.03 pore volume.

10. The method of claim 9 wherein said surfactant slug is injected in an amount within the range of 0.1–0.2 pore volume.

11. The method of claim 10 wherein the concentration of surfactant in said surfactant slug is within the range of 1.0–2.0 weight percent.

12. The method of claim 1 wherein the viscosity of said hydrocarbon is less than one-half of the viscosity of the reservoir oil.

* * * * *